United States Patent [19]

Pickelman et al.

[11] 4,187,142

[45] Feb. 5, 1980

[54] METHOD FOR FORMING HIGH STRENGTH COMPOSITES

[75] Inventors: Dale M. Pickelman, Auburn; William A. Foster; Ritchie A. Wessling, both of Midland, all of Mich.

[73] Assignee: The Dow Chemical Company, Midland, Mich.

[21] Appl. No.: 825,323

[22] Filed: Aug. 17, 1977

[51] Int. Cl.$^2$ .............................................. D21H 3/38
[52] U.S. Cl. .............................. 162/146; 162/168 R; 162/168 N; 162/168 NA; 162/169
[58] Field of Search ....... 162/168 R, 168 N, 168 NA, 162/169, 146

[56] References Cited

U.S. PATENT DOCUMENTS

| | | | |
|---|---|---|---|
| 2,563,897 | 8/1951 | Wilson et al. | 162/167 |
| 2,654,671 | 10/1953 | Azorlosa | 162/168 N |
| 2,765,228 | 10/1956 | Jordan | 162/168 R |
| 3,016,325 | 1/1962 | Pattiloch | 162/164 R |
| 3,205,187 | 9/1965 | Vanderhoff | 260/29.7 |
| 3,329,560 | 7/1967 | Schikh et al. | 162/168 N |
| 3,332,834 | 7/1967 | Reynolds | 162/168 NA |
| 3,694,393 | 9/1972 | Lewis et al. | 260/29.6 |
| 3,840,489 | 10/1974 | Strazdins | 162/168 NA |
| 3,926,890 | 12/1975 | Huang et al. | 260/29.6 H |
| 3,937,648 | 2/1976 | Huebner et al. | 162/168 R |
| 3,998,690 | 12/1976 | Lyness et al. | 162/145 |
| 4,017,440 | 4/1977 | Killam | 162/168 N |
| 4,056,501 | 11/1977 | Gibbs et al. | 260/29.6 SQ |

FOREIGN PATENT DOCUMENTS

| | | | |
|---|---|---|---|
| 477265 | 9/1951 | Canada | 162/168 NA |
| 1209867 | 1/1966 | Fed. Rep. of Germany . | |

OTHER PUBLICATIONS

Alince et al., J.A.P.S. vol. 20, 2209–2219 (1976).

*Primary Examiner*—S. Leon Bashore
*Assistant Examiner*—William F. Smith
*Attorney, Agent, or Firm*—I. A. Murphy

[57] ABSTRACT

A process for preparing a high strength composite by (A) mixing (1) an aqueous slurry of negatively charged, water-insoluble natural or synthetic fiber such as cellulose fiber, (2) a latex having a high density of pH independent cationic charges, such as sulfonium, bound at or near the particle surface, (3) a water-soluble, high molecular weight anionic polymer co-additive, such as a hydrolyzed polyacrylamide and optionally (4) conventional wet end additives; (B) draining water from the resulting aqueous suspension; (C) drying by heating.

15 Claims, No Drawings

METHOD FOR FORMING HIGH STRENGTH COMPOSITES

BACKGROUND OF THE INVENTION

(1) Field of the Invention

The invention is concerned with binder systems for use in the manufacture of high strength composites and the composites produced thereby, especially paper, paperboard, hardboard and insulation board.

(2) Description of the Prior Art

The use of a latex in the manufacture of paper by wet-end addition, or as a beater additive, is well known. Commonly, the latex has been an anionic latex but a water-soluble cationic deposition aid has been used therewith. Because of the slightly anionic nature of pulp, it has been suggested that a low-charge density cationic latex should be used in order to get good deposition on the fibers without the use of a deposition aid. Combination of anionic and cationic wet-end additives in which both species are water soluble are known. However, the combination as wet-end additives of a cationic latex with a water soluble anionic polymer, particularly latexes having particles with a high density of pH independent bound charge at or near the particle surface has not been disclosed.

SUMMARY OF THE INVENTION

This invention is concerned with the combination of (a) a natural or synthetic fiber or blend of natural and/or synthetic fiber, preferably a cellulosic fiber, (b) a cationic latex having particles with a high density of pH independent bound charges at or near the particle surface and (c) a co-additive which is a water-soluble, high molecular weight anionic polymer having an available charge of from about 0.3 milliequivalent to about 8 milliequivalents, preferably from about 0.7 milliequivalent to about 4.5 milliequivalents per gram of polymer and having an acyclic carbon-carbon chain backbone wherein the anionic polymer has the capacity to retain its solubility in the presence of polyvalent metal ions at a pH in the range from about 4 to about 7. These required ingredients, optionally together with other well known wet-end additives, are used in the wet-end of a process to produce a high strength composite.

The high strength composite is prepared by mixing the aqueous slurry of fiber, the specified latex, the co-additive and any desired conventional wet-end additives, draining the resulting suspension to form a wet mat, and drying the wet mat by heating.

The latex is added in an amount greater than that required to cause charge reversal on the fiber but less than the amount which would exceed the capacity of the fiber to hold a wet mat together during processing.

The amount of co-additive is an amount greater than that required to cause essentially complete retention of the latex on the fiber but less than the amount which would be effective to start redispersion of components of the aqueous suspension.

DESCRIPTION OF THE PREFERRED EMBODIMENTS

The product and process of this invention requires a fiber, a specific kind of cationic latex and a co-additive in particular ratios, optionally with other known wet-end additives, to prepare a high strength composite. The above-named components are used in the wet-end of the process.

The fiber is any kind of negatively charged, water insoluble, natural or synthetic fiber or blend of fibers which can be dispersed in aqueous slurry. Either long or short fibers, or mixtures thereof are useful. Suitable also are glass fibers, reclaimed waste papers, cellulose from cotton and linen rags, straws and similar materials. Particularly useful fibers are the cellulosic and lignocellulosic fibers commonly known as wood pulp of the various kinds such as mechanical pulp, steam-heated mechanical pulp, chemimechanical pulp, semichemical pulp and chemical pulp. Specific examples are groundwood pulp, unbleached sulfite pulp, bleached sulfite pulp, unbleached sulfate pulp and bleached sulfate pulp. The process is valuable in being able to use crude, low quality pulps such as "screenings", i.e., coarse by-product pulp from unbleached chemical pulps.

The cationic latex comprises a water-insoluble copolymer as particles having a high density of pH independent bound charges at or near the particle surface such as from 0.07 milliequivalent to about 0.6 milliequivalent, preferably from about 0.1 milliequivalent to about 0.6 milliequivalent, and most preferably from about 0.18 milliequivalent to about 0.5 milliequivalent, per gram of copolymer. Latexes with bound charge densities less than 0.1 meq/g tend to be insufficiently stable for some applications.

For operability in the process, the latex component is rather insensitive to the copolymer composition thereof provided that the glass transition temperature (Tg) of the copolymer is less than the temperature which will be used in the processing steps. Preferably the Tg will be room temperature or lower, even as low as $-80°$ C., although polymers having Tg values up to about 100° C. may be used. However, when the latex loading exceeds about 100 percent, based on the fiber, the wet mats are easier to handle when a hard latex copolymer is used, e.g., a copolymer having a Tg value greater than about 0° C. Nevertheless, the copolymer in the latex must be deformable at the temperature to be used in the paper processing steps.

The latexes are represented by but not restricted to structured particle latexes having a non-ionic polymer core encapsulated by a thin polymer layer having bound charges as pH independent cationic groups at or near the particle surface.

One method of obtaining such latexes is by copolymerizing under emulsion polymerization conditions an ethylenically unsaturated, activated-halogen monomer onto the particle surface of a non-ionic, organic polymer which is slightly cationic through the presence of adsorbed cationic surfactant. The resulting latex is reacted with a non-ionic nucleophile to form a latex suitable for use in the practice of this invention. Representative latexes and further details of the method of preparation are described and claimed in the copending application of Gibbs et al., Ser. No. 569,723, filed Apr. 21, 1975, now U.S. Pat. No. 4,056,501, the entire specification being incorporated herein by reference.

Ordinarily, the particle size will range from about 500 Angstroms to about 5000 Angstroms, preferably from about 1000 Angstroms to about 3000 Angstroms.

By "bound" as applied to groups or charges is meant that they are not desorbable under the conditions of processing. A convenient test is by dialysis against deionized water.

By the term "pH independent groups" as applied to ionic groups is meant that the groups are predominantly in ionized form over a wide range in pH, e.g., 2-12. Representative of such groups are sulfonium, sulfoxonium, isothiouronium, pyridinium and quaternary ammonium groups.

By "available charge" is meant the amount of charge an ionizable group would provide to a polymer when completely ionized.

By the term "non-ionic" as applied to the monomers in this specification is meant that the monomers are not ionic per se nor do not become ionic by a simple change in pH. For illustration, while a monomer containing an amine group is non-ionic at high pH, the addition of a water-soluble acid reduces the pH and forms a water-soluble salt; hence, such a monomer is not included. The non-ionic nucleophiles, however, are not similarly restricted, i.e., "non-ionic" as used with mucleophiles applies to such compounds which are non-ionic under conditions of use and tertiary amines, for example, are included.

The co-additive required for the practice of this invention is a water-soluble, high molecular weight anionic polymer having a degree of polymerization above about 3,000 preferably about 5,000 and having an available charge of from about 0.3 milliequivalent to about 8 milliequivalents, preferably from about 0.7 milliequivalent to about 4.5 milliequivalents, per gram of polymer, such anionic polymer having an acyclic carbon-carbon chain backbone and having the capability of retaining its solubility in the presence of polyvalent metal ions at a pH in the range from about 4 to about 7. Such water-soluble polymers may be natural or synthetic. The upper limit of the degree of polymerization is not critical provided that the co-additive has the requisite solubility. In some cases, such as a partially cross-linked polymer, the DP value is indeterminate. Representative examples of the co-additive are polymers such as water-soluble high molecular weight acrylamide polymers having pendant anionic groups represented by carboxyl, sulfate, sulfonate and the like, sodium polystyrene sulfonate, partially hydrolyzed copolymers of vinyl acetate and acrylic acid, sulfated polyvinyl alcohols, polyvinyl acetate polymers having pendant anionic groups represented by carboxyl, sulfate and sulfonate and copolymers of hydroxyethyl acrylate and sulfoethyl methacrylate.

The optimum charge on the co-additive depends somewhat on the hardness of the water used, i.e., the concentration of multivalent cations such as $Ca^{++}$ in the water. Generally polymers of low available charge content, such as less than about one milliequivalent of available charge per gram (meq/g) of polymer, work best in hard water. However, in soft water, better results are obtained when the anionic co-additive has greater than one milliequivalent of available charge per gram of polymer.

The co-additive is used in an amount greater than that required to cause essentially complete retention of the latex on the fiber but less than the amount which would be effective to start redispersion of components of the aqueous suspension. Such an amount usually is of from about 0.05 percent to about 160 percent by weight based on the dry weight of the fiber.

The latex is added in an amount greater than that required to cause charge reversal on the fiber but less than the amount which would exceed the capacity of the fiber to hold a wet mat together during processing. Such an amount usually is from about 0.5 percent to about 2000 percent, solids basis calculated on the dry weight of the fiber.

The process to prepare the product of this invention preferably is carried out as follows: A dilute aqueous suspension of the fiber is formed in the normal manner often in a concentration of from about 0.5 percent to about 6 percent. The latex is added at any convenient concentration, often in the concentration as supplied and the resulting mixture is stirred, usually for at least two minutes depending somewhat on the equipment available. The aqueous suspension usually is then diluted further, often with white water from the process. The co-additive is added as an aqueous solution at a concentration usually less than about 1 percent solids and the mixture is stirred generally for near the minimum time to obtain thorough mixing. While the co-additive is usually the last component added at the wet-end of the process, it may be added at any time. Optional wet-end additives can be added at a suitable time.

Other optional constituents of the composite-forming composition at the wet-end in the present process include pigments, fillers, curing agents, waxes, oils and other common additives well known in the paper-making art.

A composite is formed by flowing the resulting suspension over a porous support such as a screen to form a wet mat, dewatering the wet mat and completing drying by heating. The dewatering step includes draining and may include wet pressing. Pressing and heating may be carried out simultaneously to form a composite. Alternatively, ambient temperature pressing followed by heating to complete drying may be employed. Optionally, other compacting, shaping, tempering and curing steps may be included. The temperatures used for hot pressing, curing and tempering or other heating steps often are from about 100° C. to about 250° C., although higher or lower temperature are operable.

For making many of the composites, paper machines such as a Fourdrinier machine, a cylinder machine or a laboratory sheet-forming apparatus are useful.

The process of the invention is advantageous compared to prior art processes in that there is better retention; i.e., more of the suspended solids are removed from the aqueous suspension. During carrying out of the process, the shear stability of the system allows mechanical working without redispersion of solids. Hence, the effluent from the process is lower in solids which allows the use of a higher level of recycle and minimizes discharge of pollutants to the environment.

The product of the process of this invention has improved internal bond strength compared to prior art methods. Within the range of permissible variables in carrying out the invention at low levels of latex, the properties are more sensitive to degree of bonding of polymer particles to fiber than to properties of the polymer composition. At high levels of latex, if sufficient heat is applied to fuse the latex particles, the properties of the resulting product depend markedly on the properties of the polymer phase.

In this specification and claims, all references to degree of polymerization (DP) are weight average unless otherwise indicated.

The following examples illustrate ways in which the present invention may be carried out, but should not be construed as limiting the invention. All parts and percentages are by weight unless otherwise expressly indicated.

Many of the latexes used in the examples are identified in Table I. The monomers shown for the base latex were polymerized under emulsion polymerization conditions using dodecylbenzyldimethylsulfonium chloride as emulsifier in amounts varying from 1.8 to 2.5 percent, 0.2 percent of dodecanethiol as chain transfer agent and 0.5 percent of α,α'-azobisisobutyronitrile as catalyst, the percentages being based on the total weight of monomers. The base latex particles were then capped (encapsulated) by adding the cap monomers of the kind and in the amount shown in Table I in a continuous manner over a period of about one hour for each 100 grams of the total monomeric components. Additional catalyst of the same kind, stirring and elevated temperature, usually 70° C., were used for the capping reaction. The resulting latex products were then reacted at a temperature of 70° C. with an excess of a nucleophile which was 2-(dimethylamino)ethanol (for the quaternary ammonium bound charge) and the excess nucleophile was removed by steam distillation after the desired amount of bound charge was reached. For the sulfonium bound charge, the nucleophile was dimethyl sulfide, the reaction temperature was 50° C. and excess nucleophile was removed by vacuum distillation. The structured particle latexes thus produced had the properties shown in Table I.

Latex X (also shown in Table I) was prepared by the same process steps as Latex B but the overall average monomer composition used in the preparation of Latex B was used both in the base latex and in the cap for Latex X to give rather uniform composition throughout the latex particles.

Tests referred to in the examples were carried out as follows:

Tensile

Tensile values are recorded as breaking length, in meters, and are determined according to TAPPI Standard T 494-os-70 except the values are the average of 3 samples rather than 10 and the jaw gap is 2 inches rather than 8 inches.

Canadian Standard Freeness (CSF)

The values are determined according to TAPPI Standard T 227-M-58 except where variations in the procedure are indicated.

Delamination Resistance

The internal bond strength of the products is measured by the delamination resistance test. In this test, a strip one inch in width of the product to be tested is placed between two strips of adhesive tape having sufficient adhesiveness that failure will occur in the paper when the two pieces of tape are pulled apart. Delamination is started by hand, then continued and measured by an Instron Tensile Tester using a jaw separation rate of 12 inches per minute. The average force resisting delamination over a length of about four inches is determined for each of two samples. The average of the two samples is recorded in ounces per inch of width, abbreviated oz/in. Those values are followed in parenthesis by conversion to metric units, i.e., grams per 2.54 centimeters (g/2.54 cm). When a different testing tape is used, the new tape is calibrated according to the initial tape and values are reported in values according to the initial tape.

EXAMPLE 1

A steam-heated, mechanically-defibered pulp having a Canadian Standard Freeness (CSF) of 785 milliliters and a solids content of 24% was diluted to 1% solids with water having a hardness of 10.6 (as $CaCO_3$, ppm) and an alkalinity of 48 (as $CaCo_3$, ppm). The components shown in Table II were added to the resulting fiber suspension in the order shown and stirring was continued for the time indicated before the next step. About 3% of Latex A would be required to reach the charge reversal point of the pulp.

TABLE I[a]

| | Base Latex | | | | | Cap | | | | Structured Particle Latex | | | |
|---|---|---|---|---|---|---|---|---|---|---|---|---|---|
| | St | Bd | VBC | VCN | $Tg^d$ | St | Bd | VBC | Cap | VBC | Bound Charge | | Particle[b] Size | Solids[c] |
| Latex | % | % | % | % | °C. | % | % | % | % | % | Kind | Meq/g | Angstroms | % |
| A | 65 | 35 | | | | 15 | 35 | 50 | 20 | 10 | N+ | 0.365 | 1290 | 31.5 |
| B | 65 | 35 | | | 2 | 15 | 35 | 50 | 20 | 10 | N+ | 0.300 | 1760 S | 40 |
| C | 65 | 35 | | | 2 | 15 | 35 | 50 | 30 | 15 | N+ | 0.223 | 1250 | 27.5 |
| D | 65 | 35 | | | 2 | 15 | 35 | 50 | 30 | 15 | N+ | 0.294 | 1250 | 29.2 |
| E | 65 | 35 | | | 2 | 15 | 35 | 50 | 30 | 15 | N+ | 0.415 | 1250 | 29.4 |
| F | 55 | 45 | | | −15 | | 50 | 50 | 13 | 6.5 | S+ | 0.176 | 1190 | 27.0 |
| G | 60 | 40 | | | −8 | | 50 | 50 | 13 | 6.5 | S+ | 0.173 | 1335 | 23.9 |
| H | 65 | 35 | | | 2 | | 50 | 50 | 13 | 6.5 | S+ | 0.199 | 1360 | 23.2 |
| I | 70 | 30 | | | 20 | | 50 | 50 | 13 | 6.5 | S+ | 0.193 | 1320 S | 30 |
| J | 65 | 35 | | | 2 | 15 | 35 | 50 | 20 | 10 | N+ | 0.359 | 1080 | 30.6 |
| K | 80 | 20 | | | 35 | 15 | 35 | 50 | 20 | 10 | N+ | 0.415 | 1400 | 33.1 |
| L | 90 | 10 | | | 61 | 15 | 35 | 50 | 20 | 10 | N+ | 0.452 | 1490 | 27.0 |
| M | 70 | 10 | — | 20 | 80x | 15 | 35 | 50 | 20 | 10 | N+ | 0.474 | 1490 | 32.5 |
| N | 65 | 35 | | | 2 | 13.2 | 29.4 | 57.3 | 20 | 11.5 | N+ | 0.407 | 1180 | 23.2 |
| X | 55 | 35 | 10 | | 5x | 55 | 35 | 10 | 20 | 10 | N+ | 0.400 | 1640 S | 40 |

[a]St = Styrene; VBC = Vinylbenzyl Chloride; N+ = Quaternary Ammonium; Bd = Butadiene;VCN = Acrylonitrile; S+ = Sulfonium.
[b]Average diameter determined by electron microscopy except (S) which were determinedby light scattering measurements.
[c]After steam stripping.
[d]Derived from Encyclopedia of Polymer Science and Technology, John Wiley & Sons,N.Y., 1970, Vol. 13, page 322, FIG. 8.
[x]Estimated value.

TABLE II

| Step | Component | Amount % (a) | Stirring Time Min. |
|---|---|---|---|
| 1 | Latex A | 5 | 1.5 |
| 2 | Co-additive (b) | 0.8 | 0.5 |

TABLE II-continued

| Step | Component | Amount % (a) | Stirring Time Min. |
|---|---|---|---|
| 3 | Alum | 2 | 2.0 |

(a) = Dry basis, calculated on the dry weight of fiber
(b) = Hydrolyzed polyacrylamide as described below The co-additive is a hydrolyzed polyacrylamide having a degree of polymerization of 25,000 and an available charge of 1.94 milliequivalents per gram of co-additive (meq/g).

A sheet was formed on filter paper (12.5 cm in diameter) by filtering the resulting suspension through a Buchner funnel with vacuum from a water aspirator. The resulting wet sheet was removed from the funnel, placed between two clean filter papers and 4 blotters and pressed on a Williams press at 1715 psig. After the blotters and filter papers were removed, the resulting damp sheet was dried on a hot plate at 165° C. for 5 minutes. The dried sheet was conditioned by being kept in a room maintained at 50% humidity and 23° C. for at least 2 hours, generally overnight, before testing.

The effluent from the filtration was analyzed for turbidity with a spectrophotometer as a measurement of the white water clarity. Tensile values for the composite, drainage time, and clarity (percent transmission) of the effluent from the filtration are shown in Table III.

Comparative Example 1C

A sheet was prepared in the same manner and with the same components except the latex and the co-additive were omitted. The drainage time, clarity and tensile results are shown in Table III.

TABLE III

| Example No. | Drainage Time Min. | Clarity % | Tensile a |
|---|---|---|---|
| 1 | 1.2 | 94 | 762 |
| *1C | 8.0 | 60 | 127 |

* = Not an example of the invention
a = Breaking length, meters

Example 1 illustrates the improvement in drainage time and clarity of the effluent (waste water) from the process and improvement in strength of the product provided by the invention.

EXAMPLES 2-10

For each example, an aqueous dispersion containing 1393 parts of water having a hardness of 106 ppm (calculated as calcium carbonate) and an alkalinity of 48 ppm (calculated as calcium carbonate) and 7 parts (dry basis) of unbleached Canadian softwood kraft having a Canadian Standard Freeness (CSF) of 400 ml was stirred at such a rate that the kraft was just turning over gently. To the moving kraft suspension was added 1.4 parts (dry weight basis) of Latex A. After stirring at the same rate for an additional two minutes, a dilute aqueous solution (0.2% solids) of the specified co-additive was added in the amount shown and stirring was continued for an additional 30 seconds. The resulting furnish was made into a handsheet (12 inches×12 inches) on an M/K systems "Mini-Mill" handsheet machine using water for dilution of the description given above. The handsheet was pressed to a solids content of from 37 to 38% by placing the sheet and couching blotter between two pieces of wool felt and running the resulting sandwich through the press at medium speed using a press pressure of 80 psig. The pressed sheet was removed from the wool felts, and stripped from the couching blotter, then dried in a drier maintained at 220° F. (104° C.). The product was just cockle free, and contained about 95 percent solids.

The co-additive used in the examples is a hydrolyzed polyacrylamide having 1.94 milliequivalent of available charge (carboxyl) per gram and a degree of polymerization of 25000. Data are shown in Table IV.

COMPARATIVE EXAMPLES 2C1-2C5, 5C and 8C

Comparative Examples 2C2 and 2C4 were prepared in the same manner from the same components as described for Examples 2-10. The amounts of the latex were below that required (5.5%) to cause charge reversal on the fiber used.

Comparative Examples 2C1, 2C3, 2C5, 5C and 8C were prepared in the same manner except no co-additive was included. Data for the comparative examples are included in Table IV.

TABLE IV

| Example | Latex % (a) | Co-additive % (b) | Delamination Resistance oz/in | (g/2.54 cm) |
|---|---|---|---|---|
| *2C1 | 2 | — | 9 | (260) |
| *2C2 | 2 | 0.25 | 9.5 | (270) |
| *2C3 | 5 | — | 12 | (340) |
| *2C4 | 5 | 0.25 | 12.5 | (354) |
| *2C5 | 10 | — | 16 | (450) |
| 2 | 10 | 0.25 | 18 | (510) |
| 3 | 10 | 0.5 | 18.3 | (519) |
| 4 | 10 | 1. | 19 | (540) |
| * 5C | 15 | — | 18.5 | (524) |
| 5 | 15 | 0.25 | 20.8 | (590) |
| 6 | 15 | 0.5 | 25 | (710) |
| 7 | 15 | 1. | 27.6 | (782) |
| * 8C | 20 | — | 20.5 | (581) |
| 8 | 20 | 0.25 | 23.3 | (661) |
| 9 | 20 | 0.5 | 28.7 | (814) |
| 10 | 20 | 1. | 32.6 | (924) |

*Not an example of the invention.
(a) = Calculated on fiber, dry basis.
(b) = Calculated on latex + fiber, dry basis.

EXAMPLE 11

A sheet was prepared using the materials in the same amounts and by the process described in Examples 2-10 except the latex was Latex B (see Table I), the amount of the same co-additive was 0.6%, dry basis calculated on the weight of the fiber. The sheet was tested for delamination resistance (see Table V).

COMPARATIVE EXAMPLE 11C

A sheet was prepared in the same manner with the same materials in the same amounts as in Example 11 except Latex X was used instead of Latex B. Latex B and Latex X have the same average polymer composition but Latex B is a structure particle latex whereas Latex X has rather uniform composition throughout the particle as described above. For comparison with Example 11, data are shown in Table V.

TABLE V

| Example No. | Bound Charge Location | meq/g | Delamination Resistance oz/in | (g/2.54 cm) |
|---|---|---|---|---|
| 11 | Cap | 0.300 | 21.6 | (612) |
| *11C | Through | 0.400 | 14.6 | (414) |

TABLE V-continued

| Example No. | Bound Charge Location | meq/g | Delamination Resistance oz/in | (g/2.54 cm) |
|---|---|---|---|---|
| | Particle | | | |

*Not an example of the invention.

From these delamination resistance values shown in Table V, it is seen that Example 11 (an example of the invention) provides considerable improvement over a process using a latex having the bound charges throughout the particle rather than only near the particle surface even though the total charge was greater for comparative Example 11C.

EXAMPLES 12-14

Sheets were prepared in the same manner as described for Example 11 except that for Latex B there were substituted Latex C, Latex D and Latex E, respectively. The latter three latexes differ from each other in the amount of nucleophile (dimethylaminoethanol) reacted with the capped latex and thus differ in the amount of bound charge. Data are shown in Table VI.

TABLE VI

| Example No. | Latex | Bound Charge meq/g | Delamination Resistance oz/in | (g/2.54 cm) |
|---|---|---|---|---|
| 12 | C | 0.223 | 18.9 | (536) |
| 13 | D | 0.294 | 21.8 | (618) |
| 14 | E | 0.415 | 25.0 | (709) |

Examples 12-14 show that the internal bond strength of the product increases as the bound charge on the latex increases.

EXAMPLES 15-22

Sheets were prepared as described in Example 11 except that different latexes were used but in the same proportions. The major differences among the latexes relate to the composition in the base latex from which the structured particle latex was made (see Table I). Data are shown in Table VII.

COMPARATIVE EXAMPLE 22C

A sheet was prepared in the same manner as for Examples 15-22 except that latex and the co-additives were not included. Results are shown in Table VII.

TABLE VII

| Example No. | Latex | Core Tg °C. | Delamination Resistance oz/in | (g/2.54 cm) |
|---|---|---|---|---|
| 15 | F | −15 | 23.9 | (678) |
| 16 | G | −8 | 23.8 | (675) |
| 17 | H | 2 | 24.6 | (697) |
| 18 | I | 20 | 25.5 | (723) |
| 19 | J | 2 | 22.6 | (641) |
| 20 | K | 35 | 19.7 | (558) |
| 21 | L | 61 | 17.8 | (505) |
| 22 | M | 80 | 14.6 | (414) |
| *22C | — | — | 5.8 | (164) |

*Not an example of the invention.

Examples 15-18 illustrate the process of the invention where the sulfonium group provides the bound charge rather than the quaternary ammonium group of Examples 1-14 and shows operability of the process over a board composition of latex polymer (broad range of Tg values) at approximately equal bound charge. Within this series, there is little variation in internal bond strength in the products as shown by the delamination test.

Examples 19-22 illustrate a higher level of bound charge in the latex and variations in the base latex (core composition) to provide increasing Tg values. Within the series, as the polymers become harder (higher Tg values), the measured delamination resistance of the product sheets decreased under the conditions of these experiments. However, when the heating time was increased to 12 minutes rather than one minute, the delamination resistance was 22.4 oz/in (635 g/2.54 cm); 18.5 oz/in (524 g/2.54 cm) and 14.8 oz/in (420 g/2.54 cm), for Examples 20, 21 and 22, respectively. These examples support the position that at the higher Tg values in the disclosed range for the latex used, higher temperatures and/or longer times should be selected or conversely at a given time/temperature condition in the process a latex with sufficiently low Tg value should be used.

EXAMPLES 23-28

Sheets were prepared as described in Example 11 except a different latex was used in all these examples and the identity of the co-additive was changed but not the amount in all these examples except No. 25. Data are shown in Table VIII.

TABLE VIII

| Example No. | Latex | Co-Additive Kind | Available Charge meq/g | DP (e) | Delamination Resistance oz/in | (g/2.54 cm) |
|---|---|---|---|---|---|---|
| 23 | A | SPSS (a) | 5.3 | 17000 | 24.6 | (697) |
| 24 | A | EVMA (b) | 2.55 | i | 25.2 | (714) |
| 25 | N | AAm/COO− (c) | 1.94 | 25000 | 21.5 | (610) |
| 26 | N | AAm/COO− (c) | 1.39 | 28000 | 24.4 | (692) |
| 27 | N | AAm/COO−(c) | 2.78 | 28000 | 22.0 | (624) |
| 28 | N | AAm/AMPS (d) | 1.05 | 30000 | 20.0 | (567) |

(a)Sodium polystyrene sulfonate
(b)Copolymer of 50% of ethyl acrylate, 30% of vinyl acetate, 10% methacrylic acid,10% of acrylic acid which is solubilized in alkali, then the pH is adjusted to 7.
(c)Partially hydrolyzed polyacrylamide
(d)A copolymer of acrylamide and 2-acrylamido-2-methylpropane sulfonic acid
(e)Degree of polymerization
(i)Indeterminate because of crosslinking

EXAMPLE 29

An aqueous dispersion containing 1990 parts of water having a hardness of 106 ppm (calculated as calcium carbonate) and an alkalinity of 48 ppm (calculated as calcium carbonate) and 10 parts (dry basis) of unbleached Canadian softwood kraft having a Canadian Standard Freeness (CSF) of 400 ml was stirred at such a rate that the kraft was just turning over gently. To the moving kraft suspension was added 90 parts (dry weight basis) of Latex I. After stirring at the same rate for an additional two minutes, 3.3 parts of the specified co-additive as a dilute aqueous solution (0.2% solids) was added and stirring was continued for an additional 30 seconds. The resulting furnish was made into a handsheet (12 inches×12 inches) on an M/K Systems "Mini-Mill" handsheet machine using water for dilution of the description given above. The resulting wet sheet was placed between two pieces of clean filter paper and 4 blotters and pressed on a Williams press at 136 psig. After the blotters and filter papers were removed, the resulting damp sheet was dried on a hot plate at 165° C. for 5 minutes.

The resulting dry sheet was so strong that the delamination resistance could not be determined by the method disclosed in this specification.

The co-additive used in the example was a hydrolyzed polyacrylamide having 1.94 milliequivalents of anionic group (carboxyl) per gram and a degree of polymerization of 5500.

EXAMPLE 30

A sheet was prepared using the same materials in the same amounts and by the process described in Examples 2-10 except the amount of the same co-additive was 0.1% and the latex was a latex prepared according to U.S. Pat. No. 3,873,488 in a batch process from 65 parts of styrene, 30 parts of butadiene, 5 parts of acrylonitrile and 4 parts of vinylbenzylmethyldodecylsulfonium chloride with no additive nonpolymerizable surface active material. The latex had a solids content of 23.9%, a particle size of 1090 angstroms (determined by light scattering) and 0.072 milliequivalent of bound charge per gram of polymer. The estimated Tg was 25° C. The delamination resistance of the sheet was 19.3 oz/in (547 g/2.54 cm).

This example illustrates the practice of the invention using a latex having a level of bound charge near the minimum suitable for this invention and also illustrates the use of a latex which is not prepared according to the method disclosed and claimed for structured particle latexes in Ser. No. 569,723, filed Apr. 21, 1975, now U.S. Pat. No. 4,056,501.

EXAMPLES 31 and 32

Sheets were prepared using the same materials in the same amounts and by the process described for Examples 2-10 except the latex was as described below, a different co-additive was used in the amount shown in Table IX and deionized water was substituted for the water.

The latex as described, at 23% solids and having a particle size of 880 angstroms, was a structured particle latex prepared according to application Ser. No. 569,723, filed Apr. 21, 1975, now U.S. Pat. No. 4,056,501 having 100 parts of a core copolymer of 40% of styrene, and 60% of butyl acrylate (core Tg= −10° C.) capped by 10 parts of a copolymer of 33% of vinylbenzyl chloride and 67% of butyl acrylate which was subsequently reacted with trimethylamine to provide 0.121 milliequivalent of bound charge per gram of latex, solids basis.

The co-additive used in these examples was a hydrolyzed polyacrylamide having a degree of polymerization of 20,800 and an available charge of 3.48 milliequivalent (from carboxyl groups) per gram. Data are shown in Table IX.

COMPARATIVE EXAMPLES 31C1 and 31C2

Sheets were prepared in the same manner as for Examples 31 and 32 except that both the latex and the co-additive were omitted in 31C1 and the co-additive was omitted in 31C2. Data are included in Table IX.

TABLE IX

| Example No. | Latex % a | Co-Additive % a | Delamination Resistance oz/in | (g/2.54 cm) |
|---|---|---|---|---|
| *31C1 | 0 | 0 | 5.8 | (164) |
| *31C2 | 20 | 0 | 9.0 | (250) |
| 31 | 20 | 0.1 | 13.1 | (371) |
| 32 | 20 | 0.25 | 19.1 | (541) |

*Not an example of the invention.
a = Solids basis, calculated on the fiber.

Examples 31 and 32 illustrate the invention using a softer water, i.e., deionized water, a different co-additive and a latex having different composition than in the other examples of the invention.

That which is claimed is:

1. A method for preparing high strength composites comprising
   (a) mixing an aqueous slurry of a negatively charged, water-insoluble natural or synthetic fiber or a blend of such fibers with a latex containing a cationic water insoluble copolymer as particles having pH independent bound charges at or near the particle surface in an amount from about 0.07 milliequivalent to about 0.6 milliequivalent per gram of copolymer and a co-additive which is a water-soluble anionic polymer having a degree of polymerization above about 3000, having an available charge of from about 0.3 milliequivalent to about 8 milliequivalents per gram of polymer, having an acyclic carbon-carbon chain backbone and having the capability of retaining its solubility in the presence of polyvalent metal ions at a pH from about 4 to about 7 to form an aqueous suspension of components; the amount of said latex being more than the amount required to cause charge reversal on the fiber but less than the amount which would exceed the capacity of the fiber to hold a wet mat together during processing; and the amount of said co-additive being greater than that required to cause essentially complete retention of the latex on the fiber but less than the amount which would be effective to start redispersion of the components of the aqueous suspension;
   (b) removing water from the aqueous suspension to form a wet mat;
   (c) drying the mat by heating; said copolymer particles of the latex being deformable at the temperature used in heating the mat.

2. The method of claim 1 in which the fiber is cellulosic.

3. The method of claim 2 in which the fiber is wood pulp.

4. The method of claim 1 in which the cationic polymer particles are structured particles consisting of a non-ionic organic polymer core encapsulated by a thin polymer layer having bound charges of pH independent cationic groups at or near the particle surface.

5. The method of claim 1 in which the amount of latex, solids basis, is from about 0.5 percent to about 2000 percent based on the weight of the fiber.

6. The method of claim 1 in which the amount of bound charges in the latex is greater than 0.1 milliequivalent per gram.

7. The method of claim 1 in which the amount of bound charges in the latex is from about 0.18 milliequivalent to about 0.5 milliequivalent per gram of copolymer.

8. The method of claim 1 in which the co-additive is an acrylamide polymer.

9. The method of claim 8 in which the anionic charge of the co-additive is provided by a carboxyl group.

10. The method of claim 1 in which the co-additive is used in an amount of from about 0.05 percent to about 160 percent by weight, based on the dry weight of the fiber.

11. The method of claim 1 in which the amount of available charge of the co-additive is from about 0.7 milliequivalent to about 4.5 milliequivalents per gram.

12. The method of claim 1 in which the co-additive has a degree of polymerization greater than about 5000.

13. The method of claim 1 which has a wet pressing step.

14. A method according to claim 1 in which the pH independent bound charges are quaternary ammonium or sulfonium.

15. The process of claim 1 in which the latex is prepared by steps comprising emulsion polymerization.

* * * * *